(12) United States Patent
Yoshida et al.

(10) Patent No.: US 11,043,685 B2
(45) Date of Patent: Jun. 22, 2021

(54) METHOD AND APPARATUS FOR PRODUCING RESIN FRAME EQUIPPED MEMBRANE ELECTRODE ASSEMBLY

(71) Applicant: HONDA MOTOR CO., LTD., Tokyo (JP)

(72) Inventors: Kohei Yoshida, Wako (JP); Kensuke Namba, Wako (JP); Yosuke Konno, Wako (JP); Masami Kurimoto, Wako (JP); Yusuke Wada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 15/960,623

(22) Filed: Apr. 24, 2018

(65) Prior Publication Data

US 2018/0316034 A1    Nov. 1, 2018

(30) Foreign Application Priority Data

Apr. 28, 2017  (JP) .............................. JP2017-090124
Apr. 28, 2017  (JP) .............................. JP2017-090129

(51) Int. Cl.
*H01M 8/00*       (2016.01)
*H01M 8/1004*   (2016.01)
(Continued)

(52) U.S. Cl.
CPC ....... *H01M 8/1004* (2013.01); *H01M 8/0273* (2013.01); *H01M 8/0286* (2013.01); *H01M 2008/1095* (2013.01)

(58) Field of Classification Search
CPC ............. H01M 8/1004; H01M 8/0286; H01M 8/0273; H01M 2008/1095
See application file for complete search history.

(56) References Cited

U.S. PATENT DOCUMENTS 9,553,324 B2      1/2017  Tanaka et al.
2012/0258379 A1*  10/2012 Fukuta ................ H01M 8/0206
                                                                429/457
(Continued)

FOREIGN PATENT DOCUMENTS

JP    2003-332177    11/2003
JP    2007-157438     6/2007
(Continued)

OTHER PUBLICATIONS

Machine translation of KR-20090062411-A, obtained Sep. 30, 2019 (Year: 2009).*

*Primary Examiner* — Nicholas P D'Aniello
(74) *Attorney, Agent, or Firm* — Amin, Turocy & Watson, LLP

(57) ABSTRACT

A method for producing a resin frame equipped membrane electrode assembly includes: a first conveyance step of supporting a sheet-shaped member having a cathode and an electrolyte membrane by a resin frame member to which the sheet-shaped member is joined and linearly conveying the supported sheet-shaped member to a pressure bonding device; a second conveyance step of conveying an anode to the pressure bonding device by way of a rotary table; and a pressure bonding step of heating and pressing the cathode and the anode from above and below by the pressure bonding device to thereby integrate the cathode and the anode together.

4 Claims, 6 Drawing Sheets

(51) Int. Cl.
    *H01M 8/0273*     (2016.01)
    *H01M 8/0286*     (2016.01)
    *H01M 8/1018*     (2016.01)

(56) References Cited

U.S. PATENT DOCUMENTS

| | | |
|---|---|---|
| 2015/0236360 A1 | 8/2015 | Roemer et al. |
| 2016/0359177 A1 | 12/2016 | Fujii et al. |
| 2017/0317373 A1 | 11/2017 | Stahl et al. |
| 2018/0183073 A1 | 6/2018 | Oku et al. |

FOREIGN PATENT DOCUMENTS

| | | | |
|---|---|---|---|
| JP | 2008-071542 | | 3/2008 |
| JP | 2008-130433 | | 6/2008 |
| JP | 2009-176573 | | 8/2009 |
| JP | 2010-102857 | | 5/2010 |
| JP | 2010-201593 | | 9/2010 |
| JP | 2014-103036 | | 6/2014 |
| JP | 2014-137936 | | 7/2014 |
| JP | 2014-179252 | | 9/2014 |
| JP | 2014-182967 | | 9/2014 |
| JP | 2015-060621 | | 3/2015 |
| JP | 2016-225274 | | 12/2016 |
| KR | 20090062411 A | * | 6/2009 |
| WO | 2016/116441 | | 7/2016 |
| WO | 2016/203926 | | 12/2016 |

* cited by examiner

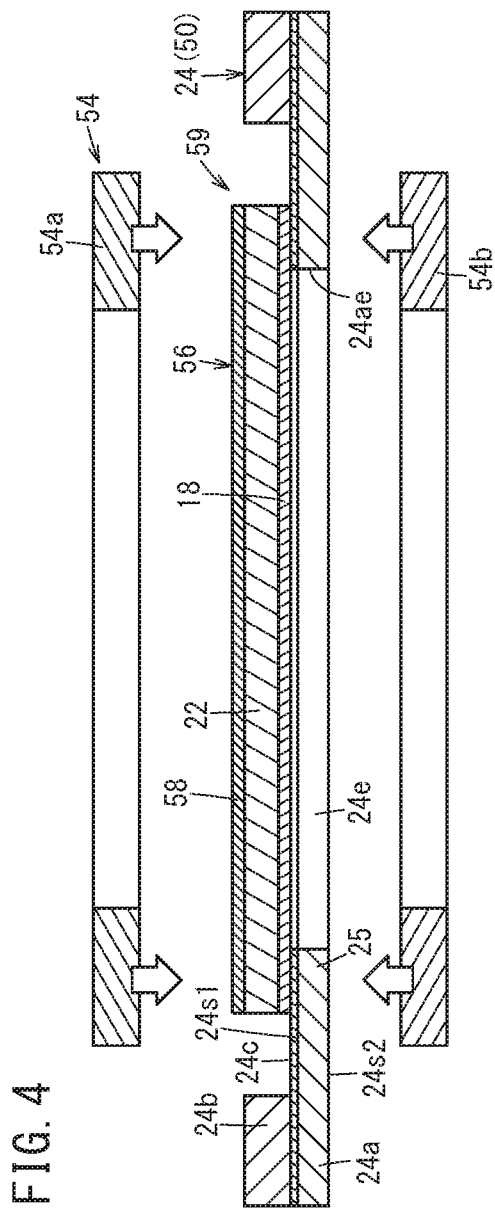

METHOD AND APPARATUS FOR PRODUCING RESIN FRAME EQUIPPED MEMBRANE ELECTRODE ASSEMBLY

CROSS-REFERENCE TO RELATED APPLICATIONS

This application is based upon and claims the benefit of priority from Japanese Patent Applications No. 2017-090124 filed on Apr. 28, 2017, and No. 2017-090129 filed on Apr. 28, 2017, the contents all of which are incorporated herein by reference.

BACKGROUND OF THE INVENTION

Field of the Invention

The present invention relates to a method and apparatus for producing a resin frame equipped membrane electrode assembly including a membrane electrode assembly and a resin frame member provided on an outer peripheral portion thereof.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA) where an anode is disposed on one surface of the solid polymer electrolyte membrane, and a cathode is disposed on the other surface thereof.

The membrane electrode assembly is sandwiched between separators (bipolar plates) to thereby form a power generation cell (unit cell). A predetermined number of the power generation cells are stacked together to thereby form a fuel cell stack. In use, for example, the fuel cell stack is mounted in a vehicle as an in-vehicle fuel cell stack.

In recent years, in an attempt to reduce the usage amount of the relatively expensive solid polymer electrolyte membrane and protect the thin solid polymer electrolyte membrane having low strength, a resin frame equipped MEA incorporating a resin frame member on its outer periphery has been adopted (see Japanese Laid-Open Patent Publication No. 2008-071542 for instance).

SUMMARY OF THE INVENTION

In the process of producing the resin frame equipped MEA, the membrane electrode assembly and the resin frame member are joined together integrally by hot pressing.

The present invention has been made in relation to the above-described conventional technique, and an object thereof is to provide a method and apparatus for producing a resin frame equipped membrane electrode assembly in which it is possible to efficiently produce a resin frame equipped membrane electrode assembly.

To accomplish the object, a first aspect of the present invention provides a method for producing a resin frame equipped membrane electrode assembly, the method including: a first conveyance step of supporting, by a resin frame member, a sheet-shaped member including a first electrode and an electrolyte membrane with the first electrode provided on one surface thereof, wherein the sheet-shaped member is joined to an inner peripheral portion of the resin frame member, and linearly conveying the supported sheet-shaped member to a pressure bonding device; a second conveyance step of conveying a second electrode to the pressure bonding device by way of a rotary table; and a pressure bonding step of heating and pressing the first electrode and the second electrode from above and below by the pressure bonding device and integrating the first electrode and the second electrode together.

Preferably, in the first conveyance step, a plurality of the sheet-shaped members are conveyed by a strip-shaped frame member material sheet containing a plurality of the resin frame members.

Preferably, the rotary table has, about an axis of rotation, three or more workpiece placement portions configured to allow the second electrode to be placed thereon.

Preferably, the rotary table includes a workpiece placement portion and a hole adjacent to a lower portion of the workpiece placement portion, the rotary table being configured to rotate about a vertical axis of rotation; a supporting pad configured to allow the second electrode to be placed thereon is disposed on the workpiece placement portion; and in the pressure bonding step, the first electrode and the second electrode are clamped from above and below by an upper mold and a lower mold of the pressure bonding device via the hole.

A second aspect of the present invention provides an apparatus for producing a resin frame equipped membrane electrode assembly, the apparatus including: a first conveying device configured to support, by a resin frame member, a sheet-shaped member including a first electrode and an electrolyte membrane with the first electrode provided on one surface thereof, wherein the sheet-shaped member is joined to an inner peripheral portion of the resin frame member, and linearly convey the supported sheet-shaped member to a pressure bonding device; a second conveying device including a rotary table and configured to convey the second electrode to the pressure bonding device by the rotary table; and the pressure bonding device configured to heat and press, from above and below, the first electrode conveyed by the first conveying device and the second electrode conveyed by the second conveying device to thereby integrate the first electrode and the second electrode together.

Preferably, the rotary table has, about an axis of rotation thereof, three or more workpiece placement portions configured to allow the second electrode to be placed thereon.

Preferably, the rotary table includes a workpiece placement portion and a hole adjacent to a lower portion of the workpiece placement portion, the rotary table being configured to rotate about a vertical axis of rotation; a supporting pad configured to allow the second electrode to be placed thereon is disposed on the workpiece placement portion; and the pressure bonding device includes an upper mold and a lower mold configured to clamp, and heat and press the first electrode and the second electrode from above and below via the hole.

According to the first and second aspects of the present invention, the first electrode and the electrolyte membrane are linearly conveyed by way of the resin frame member, while the second electrode is conveyed by way of the rotary table, and the first electrode and the second electrode are integrated together by pressure bonding in the pressure bonding device. Thus, it is possible to efficiently produce a resin frame equipped membrane electrode assembly including a membrane electrode assembly and a resin frame member joined to the outer peripheral portion of the membrane electrode assembly, the membrane electrode assembly containing the electrolyte membrane, and the first and second electrodes sandwiching the electrolyte membrane therebetween.

A third aspect of the present invention provides a method for producing a resin frame equipped membrane electrode assembly, the method including: a first joining step of thermocompression-bonding a sheet-shaped member including a first electrode and an electrolyte membrane with the first electrode provided on one surface thereof to a resin frame member having an opening and an adhesive layer provided on one surface thereof so that an outer peripheral portion of the sheet-shaped member and an inner peripheral portion of the resin frame member on the one surface are joined together; and a second joining step of thermocompression-bonding a second electrode to the resin frame member so that an outer peripheral portion of the second electrode and an inner peripheral portion of the resin frame member on another surface thereof are joined together.

Preferably, a thermocompression temperature in the second joining step is higher than a thermocompression temperature in the first joining step.

Preferably, in the second joining step, the first electrode and the second electrode are thermocompression-bonded to each other in the opening with the electrolyte membrane being interposed therebetween.

Preferably, in the first joining step, a portion where the outer peripheral portion of the electrolyte membrane overlaps the inner peripheral portion of the resin frame member is clamped and thermocompression-bonded from above and below using frame-shaped molds configured to conform to a shape of the outer peripheral portion of the first electrode.

Preferably, in the first joining step, the electrolyte membrane is thermocompression-bonded to a frame member material sheet containing a plurality of the resin frame members.

Preferably, in the second joining step, thermocompression-bonding is performed in a state in which the resin frame member joined to the sheet-shaped member is stacked on the second electrode.

According to the third aspect of the present invention, the first joining step of thermocompression-bonding the sheet-shaped member having the electrolyte membrane and the first electrode to the resin frame member, and the second joining step of thermocompression-bonding the resin frame member to the second electrode are performed, rather than integrating the electrolyte membrane, the first electrode, the second electrode, and the resin frame member together in a single thermocompression-bonding process. Thus, it is possible to efficiently produce the resin frame equipped membrane electrode assembly including the membrane electrode assembly and the resin frame member joined to the outer peripheral portion of the membrane electrode assembly, the membrane electrode assembly containing an electrolyte membrane, and the first and second electrodes sandwiching the electrolyte membrane therebetween.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is an explanatory diagram for a first joining step in which a first sheet-shaped member and a resin frame member are joined together;

DESCRIPTION OF THE PREFERRED
EMBODIMENTS

A method and apparatus for producing a resin frame equipped membrane electrode assembly according to the present invention will be described below by showing preferred embodiments and with reference to the accompanying drawings.

Figure 1:
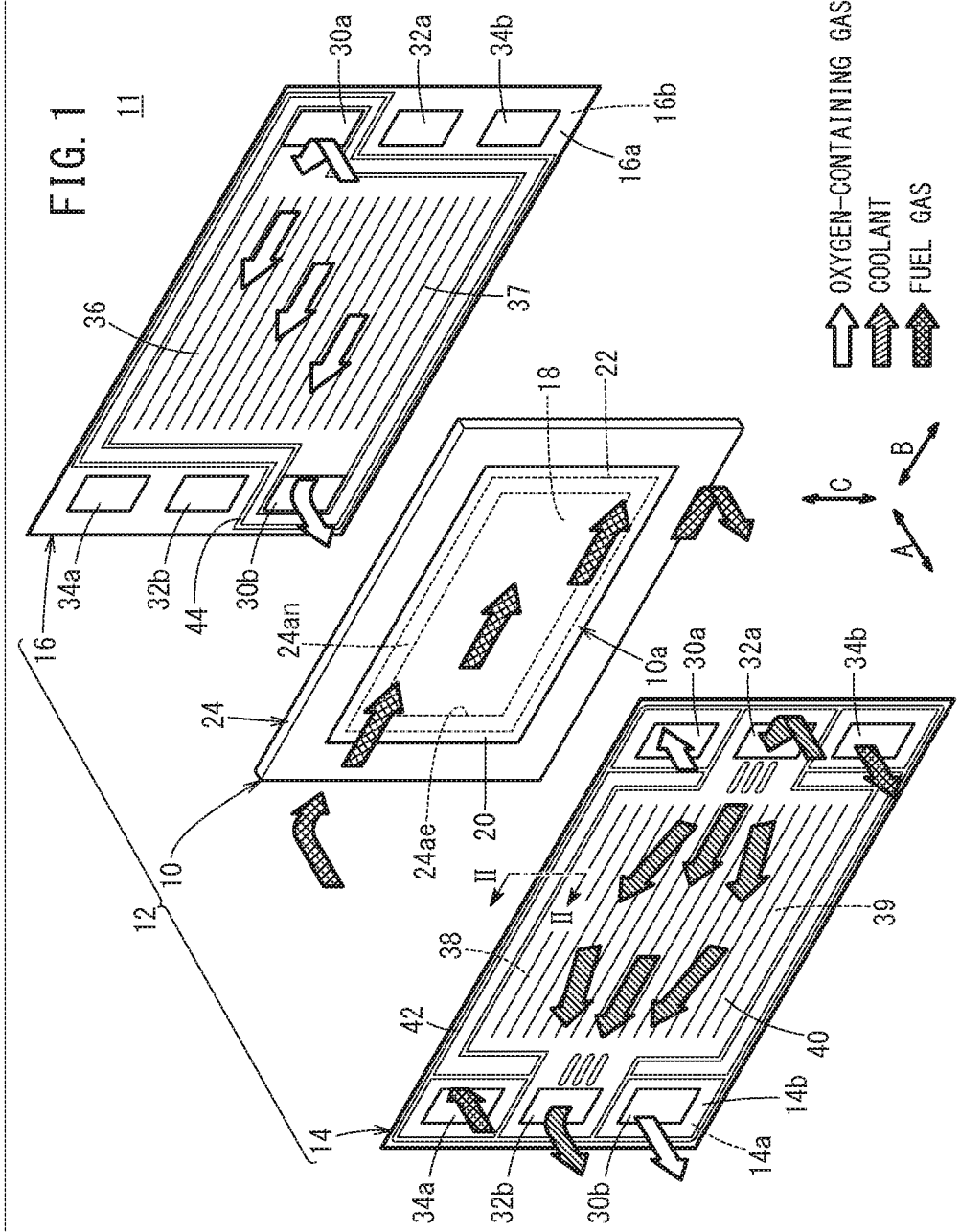
FIG. 1 is an exploded perspective view of a power generation cell of a fuel cell stack.
Figure 2:
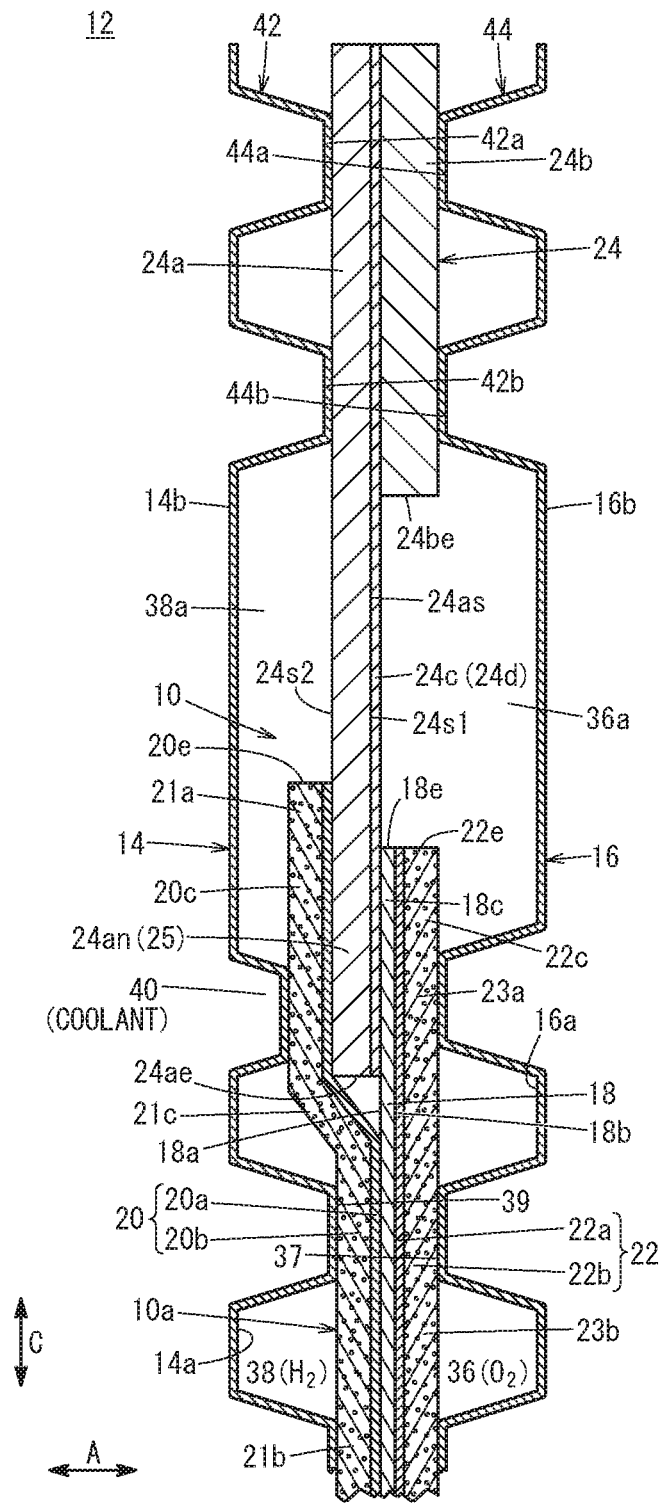
FIG. 2 is a cross sectional view taken along line II-II in FIG. 1.

As shown in FIGS. 1 and 2, a power generation cell (fuel cell) 12 includes a resin frame equipped membrane electrode assembly 10 (hereinafter referred to as a "resin frame equipped MEA 10"), and a first separator 14 and a second separator 16 provided on both sides of the resin frame equipped MEA 10. The power generation cell 12 is, for example, a laterally elongated (or longitudinally elongated) rectangular solid polymer fuel cell. A plurality of the power generation cells 12 are stacked, for example, in the direction of arrow A (the horizontal direction) or the direction of arrow C (the gravity direction) to form a fuel cell stack 11. The fuel cell stack 11 is mounted as an in-vehicle fuel cell stack, in a fuel cell electric automobile (not shown), for example.

In the power generation cell 12, the resin frame equipped MEA 10 is sandwiched between the first separator 14 and the second separator 16. The first separator 14 and the second separator 16 each have a laterally (or longitudinally) elongated rectangular shape. The first separator 14 and the second separator 16 are made of, for example, metal plates such as steel plates, stainless steel plates, aluminum plates, plated steel plates, or metal plates having anti-corrosive surfaces by surface treatment. Alternatively, carbon members may be used as the first separator 14 and the second separator 16.

The resin frame equipped MEA 10 includes a membrane electrode assembly 10a (hereinafter referred to as a "MEA 10a"), and a resin frame member 24 joined to an outer peripheral portion of the MEA 10a so as to circumferentially extend therearound. The MEA 10a includes an electrolyte membrane 18, an anode 20 provided on one surface 18a of the electrolyte membrane 18, and a cathode 22 provided on another surface 18b of the electrolyte membrane 18. The anode 20 serves as one of a first electrode and a second electrode. The cathode 22 serves as the other of the first electrode and the second electrode.

The electrolyte membrane 18 is, for example, a solid polymer electrolyte membrane (cation exchange membrane). The solid polymer electrolyte membrane is formed by impregnating a thin membrane of perfluorosulphonic acid with water, for example. The electrolyte membrane 18 is interposed between the anode 20 and the cathode 22. As the electrolyte membrane 18, a fluorine based electrolyte may be used, or alternatively a HC (hydrocarbon) based electrolyte may be used.

The surface size (outer size) of the anode 20 is larger than the surface sizes (outer sizes) of the electrolyte membrane 18 and the cathode 22. Instead of adopting the above structure, the surface size of the anode 20 may be smaller than the surface sizes of the electrolyte membrane 18 and the cathode 22.

The anode 20 includes a first electrode catalyst layer 20a joined to the one surface 18a of the electrolyte membrane 18, and a first gas diffusion layer 20b stacked on the first electrode catalyst layer 20a. The surface size of the first electrode catalyst layer 20a and the surface size of the first gas diffusion layer 20b are the same as each other, and are larger than the surface sizes of the electrolyte membrane 18 and the cathode 22.

The cathode 22 includes a second electrode catalyst layer 22a joined to the surface 18b of the electrolyte membrane 18, and a second gas diffusion layer 22b stacked on the second electrode catalyst layer 22a. The second electrode catalyst layer 22a and the second gas diffusion layer 22b have the same surface size, and are set to have the same surface size as that of the electrolyte membrane 18. Thus, an outer end 22e of the cathode 22 and an outer end 18e of the electrolyte membrane 18 are at the same position in the surface direction of the electrolyte membrane 18 (in the direction of arrow C in FIG. 2).

The surface size of the cathode 22 is smaller than the surface size of the anode 20. The outer end 22e of the cathode 22 and the outer end 18e of the electrolyte membrane 18 are positioned inside an outer end 20e of the anode 20.

The surface size of the cathode 22 may be larger than the surface size of the anode 20, and the outer end 22e of the cathode 22 may be positioned outside the outer end 20e of the anode 20. Alternatively, the surface size of the anode 20 and the surface size of the cathode 22 may have the same surface size, and the outer end 20e of the anode 20 and the outer end 22e of the cathode 22 may be at the same position in the surface direction of the electrolyte membrane 18 (in the direction of arrow C in FIG. 2).

The first electrode catalyst layer 20a is formed by, for example, uniformly depositing porous carbon particles together with an ion conductive polymer binder on the surface of the first gas diffusion layer 20b, while platinum alloy is supported on the porous carbon particles. The second electrode catalyst layer 22a is formed by, for example, uniformly depositing porous carbon particles together with an ion conductive polymer binder on the surface of the second gas diffusion layer 22b, while platinum alloy is supported on the porous carbon particles.

Each of the first gas diffusion layer 20b and the second gas diffusion layer 22b comprises a carbon paper or a carbon cloth, etc. The surface size of the second gas diffusion layer 22b is smaller than the surface size of the first gas diffusion layer 20b. The first electrode catalyst layer 20a and the second electrode catalyst layer 22a are formed respectively on both surfaces of the electrolyte membrane 18.

The resin frame member 24 has two frame-shaped sheets having different thicknesses. Specifically, the resin frame member 24 has a first frame-shaped sheet 24a including an inner peripheral portion 24an joined to the outer peripheral portion of the MEA 10a, and a second frame-shaped sheet 24b joined to the first frame-shaped sheet 24a. The first frame-shaped sheet 24a and the second frame-shaped sheet 24b are joined together in the thickness direction by an adhesive layer 24c made of adhesive 24d. The second frame-shaped sheet 24b is joined to the outer peripheral portion of the first frame-shaped sheet 24a. In the structure, the outer peripheral portion of the resin frame member 24 is thicker than an inner peripheral portion 25 of the resin frame member 24. The first frame-shaped sheet 24a and the second frame-shaped sheet 24b may instead have the same thickness.

The first frame-shaped sheet 24a and the second frame-shaped sheet 24b are made of resin material. Exemplary materials of the first frame-shaped sheet 24a and the second frame-shaped sheet 24b include polyphenylene sulfide (PPS), polyphthalamide (PPA), polyethylene naphthalate (PEN), polyethersulfone (PES), liquid crystal polymer (LCP), polyvinylidene fluoride (PVDF), silicone resin, fluororesin, modified poly phenylene ether (m-PPE) resin, polyethylene terephthalate (PET), polybutylene terephthalate (PBT), or modified polyolefin, for example.

The inner peripheral portion 25 of the resin frame member 24 (the inner peripheral portion 24an of the first frame-shaped sheet 24a) is positioned between an outer peripheral portion 20c of the anode 20 and an outer peripheral portion 22c of the cathode 22. Specifically, the inner peripheral portion 25 of the resin frame member 24 is sandwiched between an outer peripheral portion 18c of the electrolyte membrane 18 and the outer peripheral portion 20c of the anode 20. The inner peripheral portion 25 of the resin frame member 24 and the outer peripheral portion 18c of the electrolyte membrane 18 are joined together via the adhesive layer 24c. The inner peripheral portion 25 of the resin frame member 24 may instead be sandwiched between the electrolyte membrane 18 and the cathode 22.

The above-described anode 20 has a step at a position corresponding to an inner end 24ae of the first frame-shaped sheet 24a. Specifically, the anode 20 has an inclined area 21c which is inclined relative to the electrolyte membrane 18, between an area 21a contacting the inner peripheral portion 24an of the first frame-shaped sheet 24a and an area 21b contacting the electrolyte membrane 18. Accordingly, in the inclined area 21c, the first electrode catalyst layer 20a and the first gas diffusion layer 20b are inclined relative to the electrolyte membrane 18.

In the anode 20, a surface of the area 21a that is closer to the first separator 14, the area 21a contacting the inner peripheral portion 24an of the first frame-shaped sheet 24a, is at a position farther from the electrolyte membrane 18 than a surface of the area 21b that is closer to the first separator 14, the area 21b contacting the electrolyte membrane 18.

On the other hand, the cathode 22 is formed into a flat shape extending from an area 23b contacting the electrolyte membrane 18 to an area 23a overlapping the inner peripheral portion 24an of the first frame-shaped sheet 24a. Accordingly, the second electrode catalyst layer 22a and the second gas diffusion layer 22b are parallel with the electrolyte membrane 18 over a region from the area 23b contacting the electrolyte membrane 18 to the area 23a overlapping the inner peripheral portion 24an of the first frame-shaped sheet 24a.

As an alternative to the above configuration, the anode 20 may be formed into a flat shape extending from the area 21b contacting the electrolyte membrane 18 to the area 21a contacting the inner peripheral portion 24an of the first frame-shaped sheet 24a, and the cathode 22 may have an inclined area inclined relative to the electrolyte membrane 18 between the area 23b contacting the electrolyte membrane 18 and the area 23a overlapping the inner peripheral portion 24an of the first frame-shaped sheet 24a.

The second frame-shaped sheet 24b is joined to the outer peripheral portion of the first frame-shaped sheet 24a with the adhesive 24d. An inner end 24be of the second frame-shaped sheet 24b is positioned outside the inner end 24ae of the first frame-shaped sheet 24a (in the direction away from the MEA 10a) and positioned outside the outer end 20e of the anode 20 and the outer end 22e of the cathode 22.

The adhesive layer 24c is provided over an entire surface 24as of the first frame-shaped sheet 24a on a side closer to the second frame-shaped sheet 24b (cathode side). Thus, the adhesive layer 24c is provided on the inner peripheral portion 25 as well. As the adhesive 24d of the adhesive layer 24c, liquid sealant or hot melt adhesive is provided, for example. The adhesive 24d is not limited to liquid or solid adhesive, and not limited to thermoplastic or thermosetting adhesive, etc.

The resin frame member 24 may also be an integrally molded member, not limited to a structure formed by joining of the first frame-shaped sheet 24a and the second frame-shaped sheet 24b via the adhesive layer 24c. Also, the resin frame member 24 may be of a (substantially flat) shape having no step from the inner peripheral portion to the outer peripheral portion, not limited to a stepped shape having a relatively thin inner peripheral portion and a relatively thick outer peripheral portion.

As shown in FIG. 1, at one end of the power generation cell 12 in the direction of arrow B (the horizontal direction), an oxygen-containing gas supply passage 30a, a coolant supply passage 32a, and a fuel gas discharge passage 34b are provided. The oxygen-containing gas supply passage 30a, the coolant supply passage 32a, and the fuel gas discharge passage 34b extend through the power generation cell 12 in the stacking direction indicated by the arrow A. The oxygen-containing gas is supplied through the oxygen-containing gas supply passage 30a, and the coolant is supplied through the coolant supply passage 32a. A fuel gas such as a hydrogen-containing gas is discharged through the fuel gas discharge passage 34b. The oxygen-containing gas supply passage 30a, the coolant supply passage 32a, and the fuel gas discharge passage 34b are arranged in the direction of arrow C (the vertical direction).

At the other end of the power generation cell 12 in the direction of arrow B, a fuel gas supply passage 34a for supplying the fuel gas, a coolant discharge passage 32b for discharging the coolant, and an oxygen-containing gas discharge passage 30b for discharging the oxygen-containing gas are provided. The fuel gas supply passage 34a, the coolant discharge passage 32b, and the oxygen-containing gas discharge passage 30b extend through the power generation cell 12 in the direction indicated by the arrow A. The fuel gas supply passage 34a, the coolant discharge passage 32b, and the oxygen-containing gas discharge passage 30b are arranged in the direction of arrow C.

The second separator 16 has an oxygen-containing gas flow field 36 on its surface 16a facing the resin frame equipped MEA 10. The oxygen-containing gas flow field 36 is connected to the oxygen-containing gas supply passage 30a and the oxygen-containing gas discharge passage 30b. Specifically, the oxygen-containing gas flow field 36 is formed between the second separator 16 and the resin frame equipped MEA 10. The oxygen-containing gas flow field 36 includes a plurality of straight flow grooves (or wavy flow grooves) extending in the direction of arrow B.

The first separator 14 has a fuel gas flow field 38 on its surface 14a facing the resin frame equipped MEA 10. The fuel gas flow field 38 is connected to the fuel gas supply passage 34a and the fuel gas discharge passage 34b. Specifically, the fuel gas flow field 38 is formed between the first separator 14 and the resin frame equipped MEA 10. The fuel gas flow field 38 includes straight flow grooves (or wavy flow grooves) extending in the direction of arrow B.

A coolant flow field 40 is formed between a surface 14b of the first separator 14 and a surface 16b of the second separator 16 that are adjacent to each other. The coolant flow field 40 is connected to the coolant supply passage 32a and the coolant discharge passage 32b. The coolant flow field 40 extends in the direction of arrow B.

As shown in FIG. 2, a plurality of ridges 39 forming the fuel gas flow field 38 are provided on the surface 14a of the first separator 14 (the surface facing the resin frame equipped MEA 10). The ridge 39 protrudes toward the anode 20 and contacts the anode 20. A plurality of ridges 37 forming the oxygen-containing gas flow field 36 are provided on the surface 16a of the second separator 16 (the surface facing the resin frame equipped MEA 10). The ridges 37 protrude toward the cathode 22, and contact the cathode 22. The MEA 10a is sandwiched between the ridges 37 and 39.

A first seal line 42 (metal bead seal) extending around the outer peripheral portion of the first separator 14 is provided on the surface 14a of the first separator 14. The first seal line 42 is expanded toward the resin frame member 24 and contacts the first frame-shaped sheet 24a (the area overlapping the second frame-shaped sheet 24b) in an airtight and liquid-tight manner. The first seal line 42 has an outer bead 42a and an inner bead 42b provided inside the outer bead 42a.

The inner bead 42b is provided around the fuel gas flow field 38, the fuel gas supply passage 34a, and the fuel gas discharge passage 34b in a manner that the fuel gas flow field 38 is connected to the fuel gas supply passage 34a and the fuel gas discharge passage 34b. Each of the beads 42a, 42b is tapered in cross section toward the front end (toward the resin frame member 24). The front end of each of the beads 42a, 42b has a flat shape (or may have a curved shape).

A channel 38a formed between the first separator 14 and the resin frame member 24 is connected to the fuel gas flow field 38 inside the first seal line 42 (on the MEA 10a side). Thus, the channel 38a is supplied with fuel gas.

A second seal line 44 (metal bead seal) extending around the outer peripheral portion of the second separator 16 is provided on the surface 16a of the second separator 16. The second seal line 44 is expanded toward the resin frame member 24 and contacts the second frame-shaped sheet 24b in an airtight and liquid-tight manner. The first seal line 42 and the second seal line 44 face each other across the resin frame member 24. The resin frame member 24 is sandwiched between the first seal line 42 and the second seal line 44. The second seal line 44 has an outer bead 44a and an inner bead 44b provided inside the outer bead 44a.

The inner bead 44b is provided around the oxygen-containing gas flow field 36, the oxygen-containing gas supply passage 30a, and the oxygen-containing gas discharge passage 30b in a manner that the oxygen-containing gas flow field 36 is connected to the oxygen-containing gas supply passage 30a and the oxygen-containing gas discharge passage 30b. Each of the beads 44a, 44b is tapered in cross section toward the front end (toward the resin frame member 24). The front end of each of the beads 44a, 44b has a flat shape (or may have a curved shape).

A channel 36a formed between the second separator 16 and the resin frame member 24 is connected to the oxygen-containing gas flow field 36 inside the second seal line 44 (on a side adjacent to the MEA 10a). Thus, the channel 36a is supplied with oxygen-containing gas.

Operation of the fuel cell stack 11 including the power generation cell 12 thus configured will described below.

As shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, or oil is supplied to the coolant supply passage 32a.

Thus, the oxygen-containing gas flows from the oxygen-containing gas supply passage 30a to the oxygen-containing gas flow field 36 of the second separator 16, and moves in the direction of arrow B, and the oxygen-containing gas is supplied to the cathode 22 of the MEA 10a. Meanwhile, the fuel gas flows from the fuel gas supply passage 34a to the fuel gas flow field 38 of the first separator 14. The fuel gas moves in the direction of arrow B along the fuel gas flow field 38, and the fuel gas is supplied to the anode 20 of the MEA 10a.

Consequently, in the MEA 10a, the oxygen-containing gas supplied to the cathode 22 and the fuel gas supplied to the anode 20 are partially consumed in the second electrode catalyst layer 22a and the first electrode catalyst layer 20a by electrochemical reactions, thereby generating electric energy.

Then, in FIG. 1, the oxygen-containing gas after being supplied to and partially consumed at the cathode 22 is discharged in the direction of arrow A along the oxygen-containing gas discharge passage 30b. Likewise, the fuel gas after being supplied to and partially consumed at the anode 20 is discharged in the direction of arrow A along the fuel gas discharge passage 34b.

The coolant supplied to the coolant supply passage 32a flows into the coolant flow field 40 between the first separator 14 and the second separator 16, and then flows in the direction of arrow B. After cooling the MEA 10a, the coolant is discharged from the coolant discharge passage 32b.

Next, a method for producing the resin frame equipped MEA 10 according to the present embodiment will be described below.

The method for producing the resin frame equipped MEA 10 includes: a first joining step of joining a first sheet-shaped member 56 having an electrolyte membrane 18 and a first electrode (the cathode 22 in the present embodiment), which is one of the electrodes of the resin frame equipped MEA 10, to the resin frame member 24 by thermocompression-bonding using a first joining device 54 (FIG. 4); a first conveyance step of supporting the first sheet-shaped member 56 by the resin frame member 24, and conveying the supported first sheet-shaped member 56 to a second joining device 60 (hereinafter referred to as a "pressure bonding device 60") (FIG. 5); a second conveyance step of conveying a second electrode (the anode 20 in the present embodiment), which is the other electrode of the resin frame equipped MEA 10, to the pressure bonding device 60; and a second joining step (hereinafter also referred to as a "pressure bonding step") of joining the first electrode and the second electrode together by thermocompression-bonding using the pressure bonding device 60.

Figure 3A:
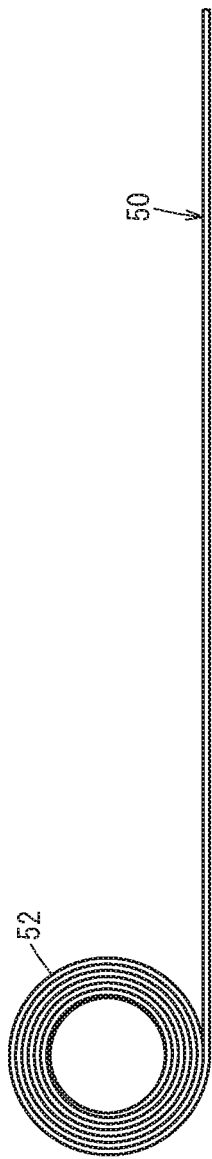
FIG. 3A is a side view of a frame member material sheet being reeled out from a roll.
Figure 3B:
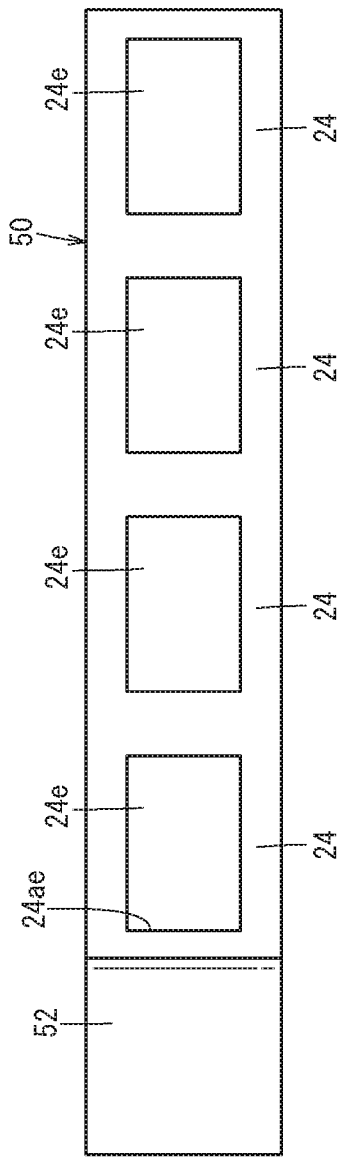
FIG. 3B is a plan view of the frame member material sheet being reeled out from the roll.

In the first joining step, a frame member material sheet 50 containing a plurality of resin frame members 24, for example, is used as shown in FIGS. 3A and 3B. Specifically, the frame member material sheet 50 is a strip-shaped member containing a plurality of resin frame members 24 serially arranged thereon as shown in FIG. 3B. A plurality of openings 24e each defining the inner end 24ae of the resin frame member 24 are spaced from each other (i.e., arranged at intervals) in the length direction of the frame member material sheet 50.

The frame member material sheet 50 is reeled out from a roll 52 (a first roll) and fed to the first joining device 54 (FIG. 4), at which the first joining step is performed. In the roll 52, the frame member material sheet 50 and a non-illustrated interlayer film (a protection film) are laminated and wound into a roll. As the frame member material sheet 50 is reeled out from the roll 52, the interlayer film is also reeled out. The reeled-out interlayer film is rewound on a wind-up roll (not shown). The frame member material sheet 50 is fed to the first joining device 54 of FIG. 4 in a state that a surface of the frame member material sheet 50 on which the adhesive layer 24c (FIG. 2) is provided is oriented upward.

As shown in FIG. 4, the first joining device 54 is fed with a rectangular first sheet-shaped member 56 having the cathode 22 and the electrolyte membrane 18 thereon. The first sheet-shaped member 56 has a first supporting sheet 58, the cathode 22 supported on the first supporting sheet 58, and the electrolyte membrane 18 with the cathode 22 provided on one surface thereof. The first supporting sheet 58 is made of carbon paper, for example.

For example, a roll of a strip-shaped, multi-layered sheet composed of the first supporting sheet 58, the cathode 22, and the electrolyte membrane 18 (hereinafter referred to as a "second roll") is used. The multi-layered sheet is reeled out from the second roll. Then, by cutting the reeled-out multi-layered sheet at predetermined intervals with a cutter (for example, a roller cutter), the rectangular first sheet-shaped member 56 having predetermined dimensions is obtained.

The first sheet-shaped member 56 is fed to the first joining device 54 with the electrolyte membrane 18 oriented downward, and placed on the resin frame member 24 (the frame member material sheet 50) (a first sheet-shaped member placement step). In this case, the first sheet-shaped member 56 is placed on the resin frame member 24 so that the electrolyte membrane 18 faces the opening 24e of the resin frame member 24 and that the outer peripheral portion 18c of the electrolyte membrane 18 overlaps the inner peripheral portion 25 of the resin frame member 24 over the entire circumference.

In the first joining step, the first sheet-shaped member 56 and the resin frame member 24 are thermocompression bonded with each other such that the outer peripheral portion 18c of the electrolyte membrane 18 is joined to the inner peripheral portion 25 of the resin frame member 24 on a first surface 24s1 (the surface on which the adhesive layer 24c is provided) over the entire circumference. Specifically, in the first joining step, a portion where the outer peripheral portion 18c of the electrolyte membrane 18 overlaps the inner peripheral portion 25 of the resin frame member 24 is clamped and thermocompression bonded (heated and pressed) from above and below using the first joining device 54 with frame-shaped molds (an upper mold 54a and a lower mold 54b) which conform to the shape of the outer peripheral portion 22c of the cathode 22.

Thermocompression bonding of the first sheet-shaped member 56 and the resin frame member 24 in the first joining step only has to produce a joining force enough for preventing movement of the first sheet-shaped member 56 relative to the resin frame member 24 until start of the pressure bonding step (the second joining step) after the first joining step. That is, the thermocompression bonding in the first joining step is temporary pressure bonding (temporary fixing) for relatively weakly joining the first sheet-shaped member 56 and the resin frame member 24 to each other. A thermocompression temperature in the first joining step may be in the range of 90° C. to 110° C., for example, and the pressing time is several seconds.

Figure 5:
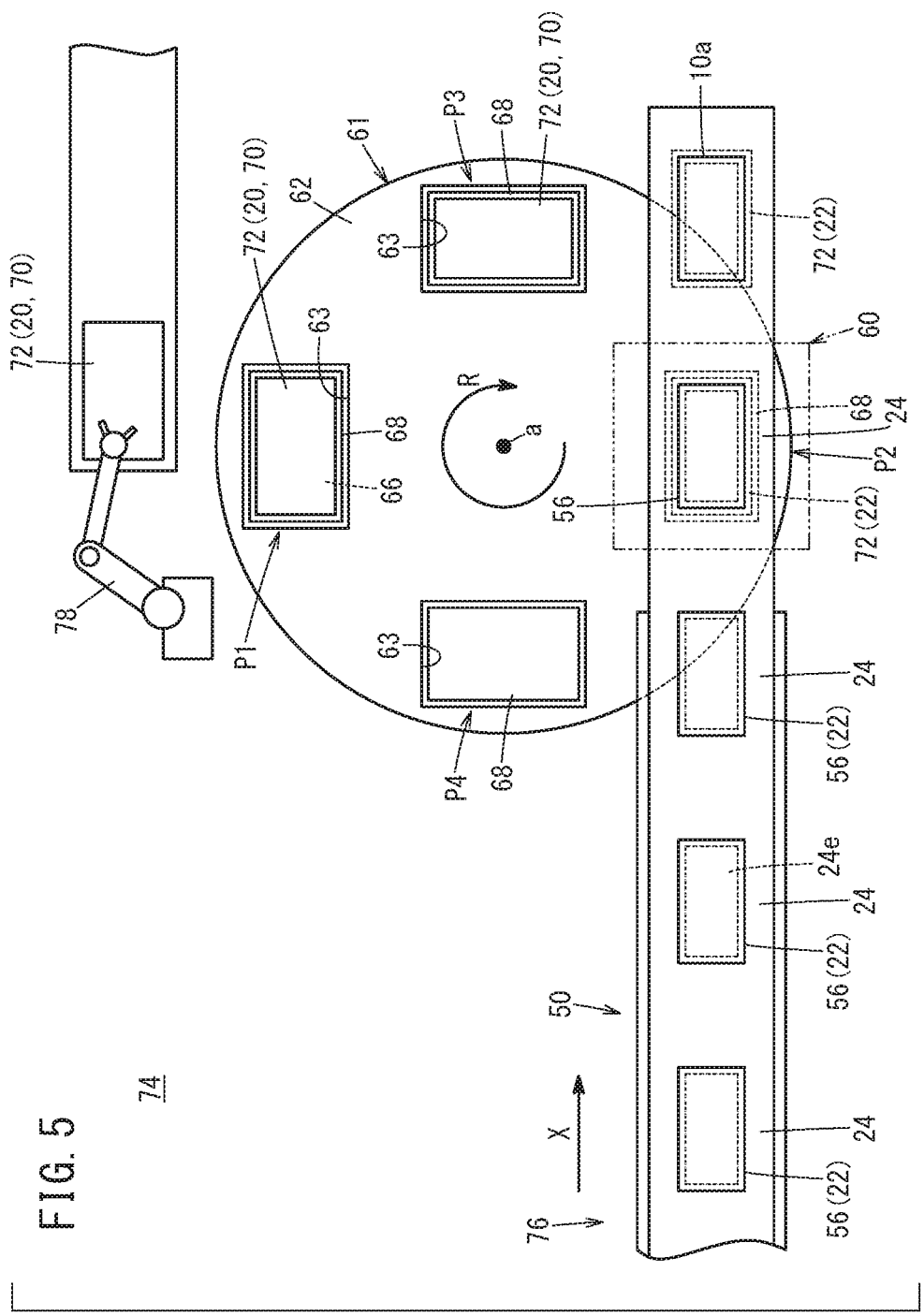
FIG. 5 is a schematic view of an apparatus for producing a resin frame equipped membrane electrode assembly according to an embodiment of the present invention.

An apparatus 74 for producing the resin frame equipped MEA 10 shown in FIG. 5 includes a first conveying device 76 that conveys the first sheet-shaped member 56 and the resin frame member 24, a second conveying device 61 that conveys the anode 20, and the pressure bonding device 60 (the second joining device) that integrates the cathode 22 and the anode 20 together by thermocompression bonding.

The first conveying device 76 performs the first conveyance step of supporting the first sheet-shaped member 56 by the resin frame member 24 and linearly conveying the supported first sheet-shaped member 56 to the pressure bonding device 60. In FIG. 5, the first sheet-shaped member 56 is an integrated component formed by integrating the member 56 with the resin frame member 24 (the frame member material sheet 50) in the above first joining step, and is conveyed in the direction of arrow X.

The second conveying device 61 includes a rotary table 62 as a workpiece holding fixture, and performs the second conveyance step in which the anode 20 is conveyed to the pressure bonding device 60 by way of the rotary table 62. The rotary table 62 is configured to rotate in the direction of arrow R about a vertical axis of rotation a. A transfer device 78 is installed near the rotary table 62 for transferring a second sheet-shaped member 72 having the anode 20 thereon to the rotary table 62.

Figure 6:
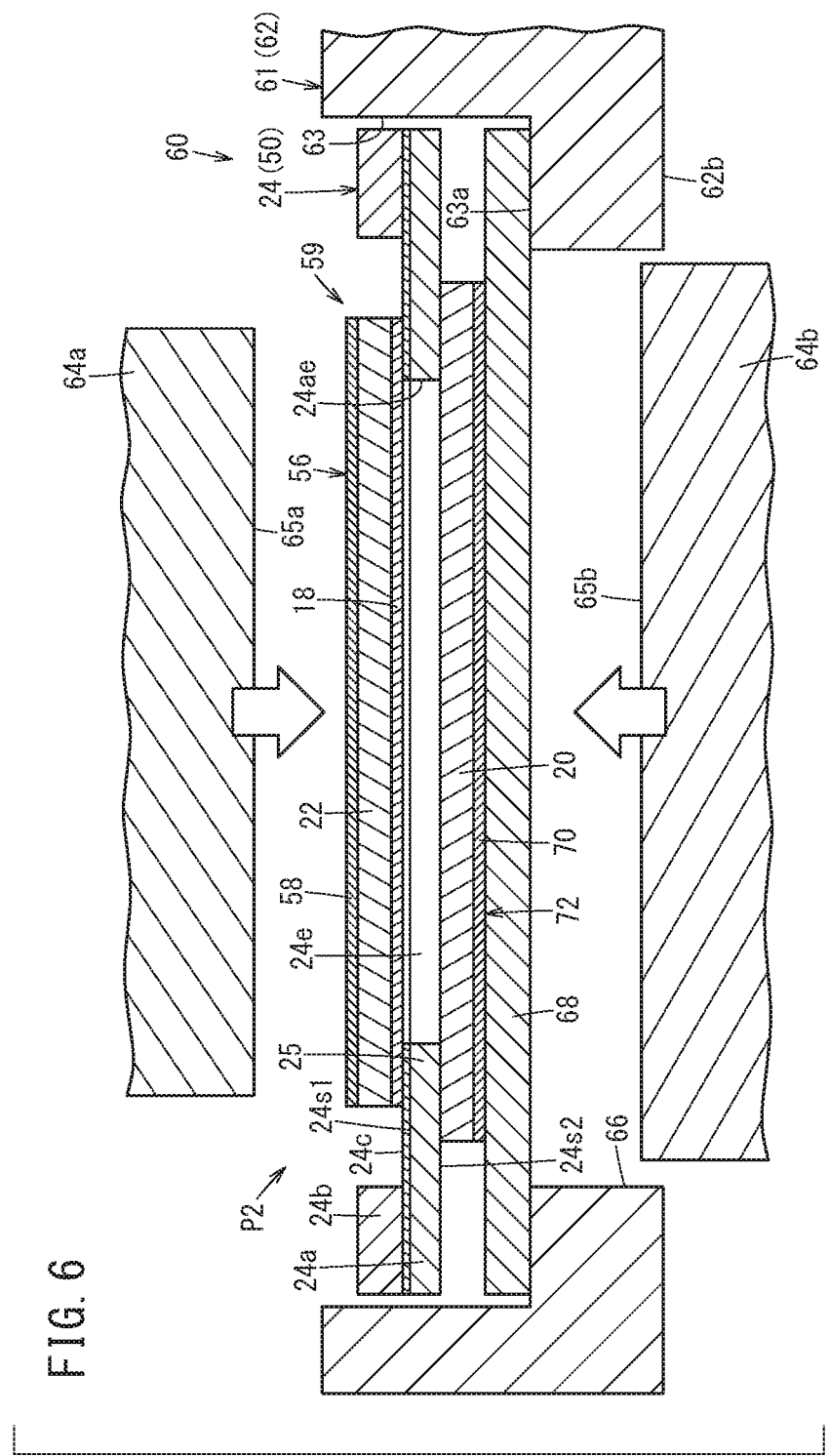
FIG. 6 is an explanatory diagram for a method for producing the resin frame equipped membrane electrode assembly according to an embodiment of the present invention.

As shown in FIG. 6, in the second sheet-shaped member 72, the anode 20 is laminated on a second supporting sheet 70. The second supporting sheet 70 is made of carbon paper, for example. The second sheet-shaped member 72 is cut off from a roll of a strip-shaped, multi-layered sheet composed of the second supporting sheet 70 and the anode 20 (hereinafter referred to as a "third roll"). Specifically, the multi-layered sheet is reeled out from the third roll. Then, the reeled-out multi-layered sheet is cut off at predetermined intervals with an unillustrated cutter (for example, a roller cutter). Thus, the rectangular second sheet-shaped member 72 having predetermined dimensions is obtained.

In FIG. 5, the second sheet-shaped member 72 after being cut is transferred to the rotary table 62 at a transfer position P1 by the transfer device 78. Specifically, the second sheet-shaped member 72 is placed on a cushion pad 68 positioned on the rotary table 62 such that the anode 20 is oriented upward (a second sheet-shaped member placement step). In this case, the second sheet-shaped member 72 is placed within a range of a hole 66 in plan view. The second sheet-shaped member 72 will not fall into the hole 66 because it is supported on the cushion pad 68. Then, with rotation of the rotary table 62 in the direction of arrow R, the second sheet-shaped member 72 is conveyed to a pressure bonding position P2 established inside the pressure bonding device 60.

As shown in FIG. 6, the rotary table 62 has a rectangular workpiece holding groove 63 (a workpiece placement portion) having a supporting surface 63a (a stepped portion), and the hole 66 adjacent to a lower portion of the workpiece holding groove 63 and having a rectangular shape in plan view. As shown in FIG. 5, three or more workpiece holding grooves 63 are formed at angular intervals (four at 90° intervals in the illustrated example) about the axis of rotation a of the rotary table 62.

As shown in FIG. 6, the rectangular cushion pad 68 (a supporting pad), which have larger outer dimensions than those of the hole 66, is placed on each supporting surface 63a so as to cover the hole 66. The hole 66 is opened at a lower surface 62b of the rotary table 62. Preferably, a groove for positioning the second sheet-shaped member 72 is formed in the upper surface of the cushion pad 68.

The first sheet-shaped member 56 and the resin frame member 24 after having been joined together in the first joining step (hereinafter referred to as an "intermediate joined component 59") is fed to the pressure bonding position P2 within the pressure bonding device 60. The pressure bonding device 60 has an upper mold 64a and a lower mold 64b for clamping the intermediate joined component 59 and the anode 20 from above and below, and heating and pressing the intermediate joined component 59 and the anode 20 from above and below. Since a part of the rotary table 62 is located within the pressure bonding device 60 (the second joining device) during thermocompression bonding of the anode 20 and the resin frame member 24, the rotary table 62 may be regarded as a part of the pressure bonding device 60. Instead of the rotary table 62, a non-rotating table may be provided as a workpiece holding fixture.

The upper mold 64a and the lower mold 64b are spaced from each other in the vertical direction so as to face each other across the workpiece holding groove 63, and are configured to be moved in the vertical direction. The lower mold 64b is inserted into the hole 66 of the rotary table 62. The opening dimensions of the hole 66 and the outer dimensions of a pressing surface 65b of the lower mold 64b are larger than the outer dimensions of the first sheet-shaped member 56 (the cathode 22 and the electrolyte membrane 18) and the outer dimensions of the second sheet-shaped member 72. The outer dimensions of a pressing surface 65a of the upper mold 64a are larger than the opening 24e of the resin frame member 24 and slightly smaller than the outer dimensions of the first sheet-shaped member 56.

At the pressure bonding position P2, the intermediate joined component 59 (the first sheet-shaped member 56 and the resin frame member 24) obtained in the first joining step is placed on the second sheet-shaped member 72. In this case, the intermediate joined component 59 is placed on the second sheet-shaped member 72 such that the anode 20 faces the opening 24e of the resin frame member 24 and that the outer peripheral portion 20c of the anode 20 overlaps the inner peripheral portion 25 of the resin frame member 24 on a second surface 24s2 over the entire circumference. As a result of this, the outer peripheral portion of the first sheet-shaped member 56 (the outer peripheral portion 18c of the electrolyte membrane 18) overlaps the outer peripheral portion of the second sheet-shaped member 72 (the outer peripheral portion 20c of the anode 20) via the inner peripheral portion 25 of the resin frame member 24.

Then, in the pressure bonding step (the second joining step), the anode 20 and the resin frame member 24 are thermocompression bonded to each other such that the outer peripheral portion 20c of the anode 20 and the inner peripheral portion 25 of the resin frame member 24 on the second surface 24s2 are joined together over the entire circumference. Specifically, in the pressure bonding step, a portion where the outer peripheral portion 18c of the electrolyte membrane 18, the inner peripheral portion 25 of the resin frame member 24, and the outer peripheral portion of the anode 20 overlap one another is clamped and thermocompression bonded (heated and pressed) from above and below by the upper mold 64a and the lower mold 64b of the pressure bonding device 60. In this case, in the pressure bonding step, the cathode 22 and the anode 20 are thermocompression bonded to each other via the opening 24e of the resin frame member 24.

In the pressure bonding step, the MEA 10a (FIG. 2) in which the cathode 22 and the anode 20 are positioned on both sides of the electrolyte membrane 18 is obtained, and an integrated component in which the resin frame member 24 (the frame member material sheet 50) is joined to and integrated with the outer peripheral portion of the MEA 10a is obtained.

The thermocompression bonding in the pressure bonding step is main pressure bonding for firmly joining the intermediate joined component 59 and the second sheet-shaped member 72 together in order to obtain a state in which the resin frame member 24 is integrated with the outer peripheral portion of the MEA 10a. Thus, the strength of joining by the thermocompression bonding in the pressure bonding step is higher than the strength of joining by the thermocompression bonding in the first joining step. The thermocompression temperature in the pressure bonding step is in the range of 160° C. to 180° C., for example. The pressing time in the pressure bonding step is preferably longer than the pressing time in the first joining step described above.

After the pressure bonding step, the frame member material sheet 50 integrated with the MEA 10a is cut into a rectangular shape having predetermined dimensions, thereby obtaining the resin frame equipped MEA 10 shown in FIG. 1.

In this case, the method for producing the resin frame equipped MEA 10 according to the present embodiment provides the following effects.

The method for producing the resin frame equipped MEA 10 includes the first conveyance step of supporting the first sheet-shaped member 56 having the cathode 22 and the electrolyte membrane 18 by the resin frame member 24, and linearly conveying the supported first sheet-shaped member 56 to the pressure bonding device 60, the second conveyance step of conveying the anode 20 to the pressure bonding device 60 by way of the rotary table 62, and the pressure bonding step of heating and pressing the cathode 22 and the anode 20 from above and below by the pressure bonding device 60 to thereby integrate the cathode 22 and the anode 20 together.

Thus, according to the method for producing the resin frame equipped MEA 10, the cathode 22 and the electrolyte membrane 18 are linearly conveyed by way of the resin frame member 24, while the anode 20 is conveyed by way of the rotary table 62, and the cathode 22 and the anode 20 are integrated together by pressure bonding in the pressure bonding device 60. Thus, it is possible to efficiently produce the resin frame equipped MEA 10 including the MEA 10a and the resin frame member 24 joined to the outer peripheral portion of the MEA 10a, wherein the MEA 10a comprises the electrolyte membrane 18, and the cathode 22 and the anode 20 sandwiching the electrolyte membrane 18 therebetween.

In the first conveyance step, a plurality of first sheet-shaped members 56 are conveyed in the form of a strip-shaped frame member material sheet 50 containing a plurality of resin frame members 24 (i.e., conveyed by the strip-shaped frame member material sheet 50). With this structure, the frame member material sheet 50 extending in the form of a strip is intermittently moved, whereby the plurality of first sheet-shaped members 56 can be sequentially conveyed to the pressure bonding device 60. Thus, it is possible to more efficiently produce the resin frame equipped MEA 10.

As shown in FIG. 5, the rotary table 62 has, about the axis of rotation, three or more workpiece holding grooves 63 on which the anode 20 can be placed. With this structure, it is possible to carry out an additional step at a midway position (a first intermediate position P3) from the transfer position P1 to the pressure bonding position P2 along the rotation direction of the rotary table 62 or at a midway position (a second intermediate position P4) from the pressure bonding position P2 to the transfer position P1 along the rotation direction of the rotary table 62. By carrying out the additional step at the first intermediate position P3 or the second intermediate position P4, space can be effectively utilized.

In this case, at the first intermediate position P3, cleaning (such as air blowing) of the anode 20 on the way to the pressure bonding device 60 may be carried out as the additional step, for example. At the second intermediate position P4, cleaning (such as air blowing) of one (or both) of the workpiece holding groove 63 and the cushion pad 68 that have left the pressure bonding device 60 may be carried out as the additional step, for example.

In the present embodiment, four workpiece holding grooves 63 are provided at angular intervals of 90° on the rotary table 62. Thus, one anode 20 corresponding to one product can be reliably conveyed at each of the angular intervals of 90°. Owing to conveying of one anode at each of the 90° intervals, it is possible to perform conveyance in a shorter period of time.

The method for producing the resin frame equipped MEA 10 includes the first joining step (FIG. 4) of thermocompression-bonding the first sheet-shaped member 56 having the cathode 22 and the electrolyte membrane 18 to the resin frame member 24 with the adhesive layer 24c provided on the first surface 24s1 so that the outer peripheral portion of the first sheet-shaped member 56 and the inner peripheral portion 25 of the resin frame member 24 on the first surface 24s1 are joined together, and the second joining step (FIG. 6) of thermocompression-bonding the anode 20 to the resin frame member 24 so that the outer peripheral portion of the anode 20 and the inner peripheral portion 25 of the resin frame member 24 on the second surface 24s2 are joined together.

Thus, according to the method for producing the resin frame equipped MEA 10, the first joining step of thermocompression-bonding the first sheet-shaped member 56 having the electrolyte membrane 18 and the cathode 22 to the resin frame member 24, and the second joining step of thermocompression-bonding the resin frame member 24 to the anode 20 are performed, rather than integrating the electrolyte membrane 18, the cathode 22, the anode 20, and the resin frame member 24 together in a single thermocompression-bonding process. Thus, it is possible to efficiently produce the resin frame equipped MEA 10 including the MEA 10a and the resin frame member 24 joined to the outer peripheral portion of the MEA 10a, the MEA 10a comprising the electrolyte membrane 18, and the cathode 22 and the anode 20 sandwiching the electrolyte membrane 18 therebetween.

The thermocompression temperature in the second joining step is higher than the thermocompression temperature in the first joining step. Accordingly, simple thermocompression-bonding is enough in the first joining step. Thus, it is possible to reduce the time required for the first joining step, and to obtain sufficient joining strength in the second joining step.

In the first joining step, the electrolyte membrane 18 (the first sheet-shaped member 56) having the cathode 22 provided on one surface thereof is thermocompression-bonded to the frame member material sheet 50 containing a plurality of resin frame members 24 (FIGS. 3A and 3B). With this structure, it is possible to continuously convey the first sheet-shaped member 56 to the second joining step (the pressure bonding device 60 or the second joining device), and thus it is possible to produce the resin frame equipped MEA 10 more efficiently.

In the second joining step, thermocompression-bonding is performed from above and below in a state in which the resin frame member 24 joined to the first sheet-shaped member 56 (the intermediate joined component 59) is stacked on the anode 20. Thus, by placing the anode 20 on a table (the rotary table 62) and stacking the resin frame member 24 joined to the first sheet-shaped member 56 on the anode 20, thermocompression-bonding can be performed in a state that the resin frame member 24 and the anode 20 are accurately and easily positioned and aligned with each other.

The first sheet-shaped member 56 may have the anode 20 thereon instead of the cathode 22, and the second sheet-shaped member 72 may have the cathode 22 thereon instead of the anode 20. In this case, in the first joining step, the outer peripheral portion 18c of the electrolyte membrane 18 having the anode 20 provided on one surface thereof is joined to the inner peripheral portion 25 of the resin frame member 24 on the first surface 24s1 by thermocompression. In the pressure bonding step, the outer peripheral portion 22c of the cathode 22 is joined to the inner peripheral portion 25 of the resin frame member 24 on the second surface 24s2 by thermocompression.

The present embodiment a cooling structure on a cell-by-cell basis where cells each formed by sandwiching one MEA between two separators are stacked together, and the coolant flows between the adjacent cells. Alternatively, a so-called skip cooling structure where coolant flows at intervals of every predetermined number of cells may be adopted. In such a case, each of the cells includes three or more separators and two or more MEAs.

The present invention is not limited to the above-described embodiment but various modifications are possible without departing from the scope of the present invention.

What is claimed is:

1. A method for producing a resin frame equipped membrane electrode assembly, the method comprising:
a first conveyance step of supporting, by a resin frame member, a sheet-shaped member including a first electrode and an electrolyte membrane with the first electrode provided on one surface thereof, wherein the sheet-shaped member is joined to an inner peripheral portion of the resin frame member, and linearly conveying the supported sheet-shaped member to a pressure bonding device;
a second conveyance step of conveying a second electrode to the pressure bonding device by way of a rotary table; and
a pressure bonding step of heating and pressing the sheet-shaped member joined to the resin frame member and the second electrode from above and below by the pressure bonding device, the heating and pressing directly bonding, via an adhesion layer, the electrolyte membrane to a first surface of the resin frame member and directly bonding the second electrode to a second surface of the resin frame member, the first surface being positioned opposite the second surface, and integrating the sheet-shaped member joined to the resin frame member and the second electrode together.

2. The method for producing the resin frame equipped membrane electrode assembly according to claim 1, wherein in the first conveyance step, a plurality of the sheet-shaped members are conveyed by a strip-shaped frame member material sheet containing a plurality of the resin frame members.

3. The method for producing the resin frame equipped membrane electrode assembly according to claim 1, wherein the rotary table has, about an axis of rotation thereof, three or more workpiece placement portions configured to allow the second electrode to be placed thereon.

4. The method for producing the resin frame equipped membrane electrode assembly according to claim 1, wherein the rotary table includes a workpiece placement portion and a hole adjacent to a lower portion of the workpiece placement portion, the rotary table being configured to rotate about a vertical axis of rotation;
a supporting pad configured to allow the second electrode to be placed thereon is disposed on the workpiece placement portion; and
in the pressure bonding step, the first electrode and the second electrode are clamped from above and below by an upper mold and a lower mold of the pressure bonding device via the hole.

* * * * *